T. L. HAMER.
TRACK SANDING MACHINE.
APPLICATION FILED DEC. 28, 1907.

899,529.

Patented Sept. 29, 1908.
2 SHEETS—SHEET 1.

WITNESSES

INVENTOR
Thomas L. Hamer
by D. A. Gowrick
Attorney

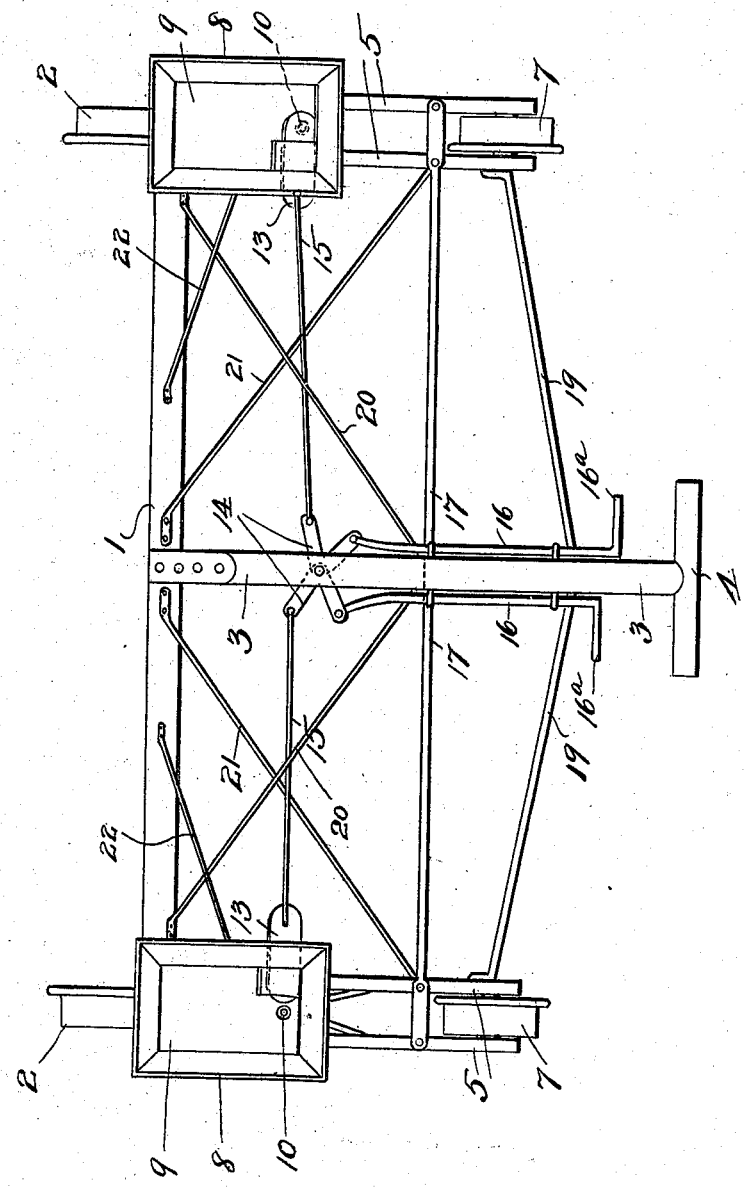

UNITED STATES PATENT OFFICE.

THOMAS L. HAMER, OF NEWARK, NEW YORK.

TRACK-SANDING MACHINE.

No. 899,529.　　　Specification of Letters Patent.　　　Patented Sept. 29, 1908.

Application filed December 28, 1907. Serial No. 408,393.

*To all whom it may concern:*

Be it known that I, THOMAS L. HAMER, a citizen of the United States, residing at Newark, in the county of Wayne and State of New York, have invented certain new and useful Improvements in Track-Sanding Machines, of which the following is a specification.

My invention relates to devices for sanding railroad tracks and consists of a hand truck having an axle with wheels journaled thereon that are to travel on the two rails of the track. Secured at each end of the axle is a frame carrying a box for containing the sand, a trailer wheel being journaled in each frame to support its rear end. The flow of sand from the boxes is regulated by means of valves having operating rods arranged for convenient operation by the operator.

The details of construction of my improved sanding machine will be described in detail hereinafter and illustrated in the accompanying drawings, in which—

Figure 1:
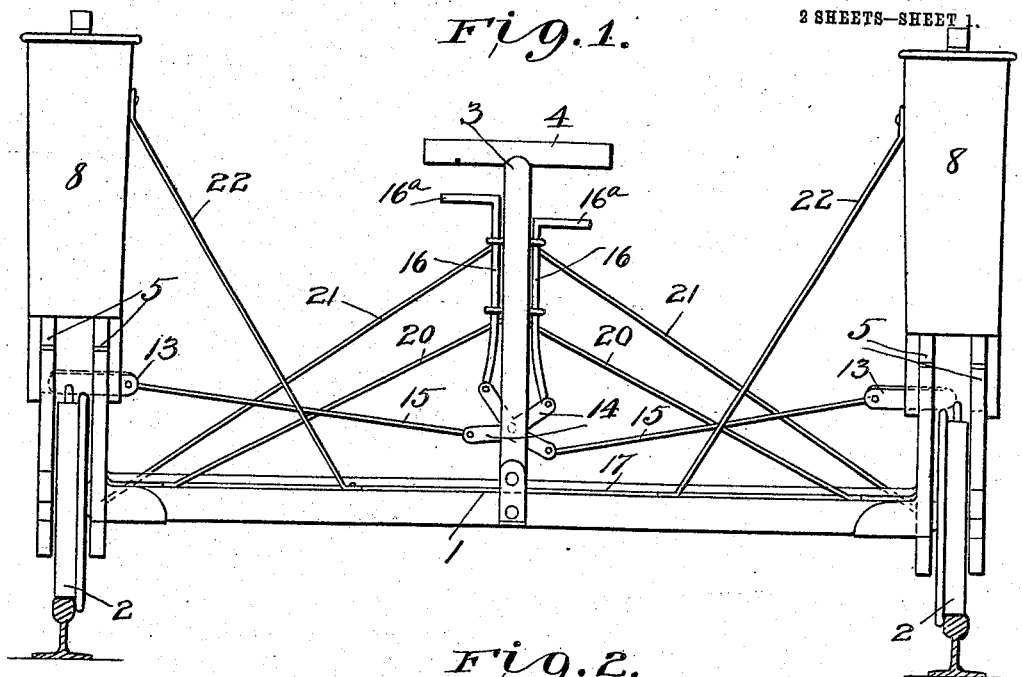
Figure 2:
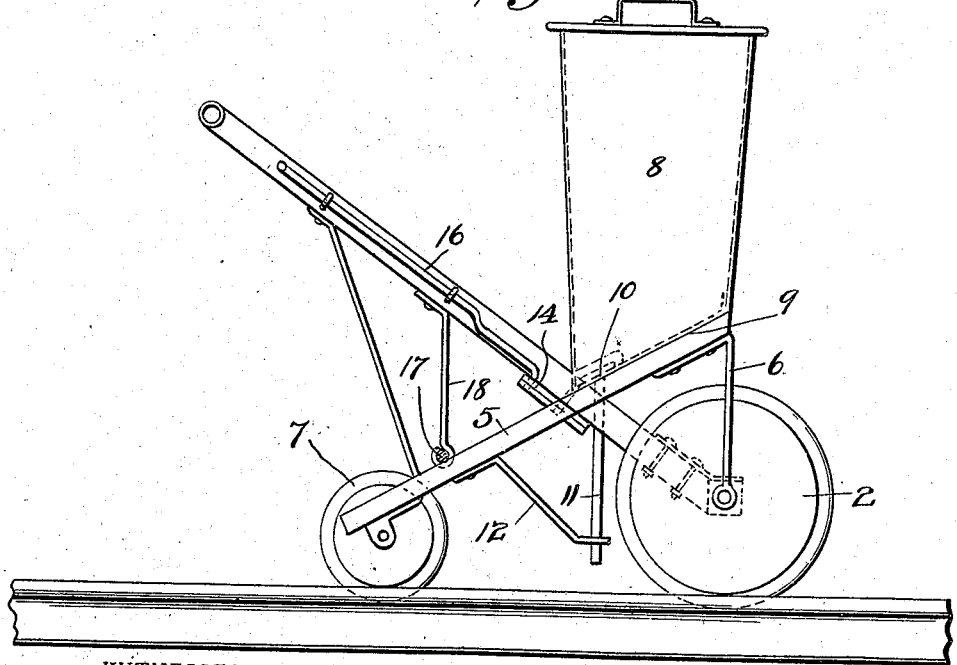

Figure 1 is a front view of my improved sanding machine, Fig. 2, a side view, and Fig. 3, a top plan view.

In the drawings similar reference characters indicate corresponding parts throughout the several views.

1 indicates an axle having flanged wheels 2 journaled at its ends and an operating handle 3 secured in its middle and provided with a cross-bar 4 for ease in pushing the device.

5 indicates two downwardly slanting beams secured to each end of axle 1 over wheels 2 by means of upright supports 6 and having a flanged wheel 7 journaled between their rear ends.

8 indicates a box secured on each pair of beams 5 above wheel 2 and having its bottom 9 slanting towards the rear and supplied with an opening 10 leading to a downspout 11 having its delivery end behind wheel 2, 12 indicating a brace secured to one of the beams 5 in each pair to support the lower end of spout 11.

13 indicates a slide valve in each opening 10 to control the egress of sand from boxes 8, 14 bell crank levers fulcrumed on handle 3, 15 rods connecting one arm of each lever 14 with the valve on the corresponding side of the machine, and 16 rods slidably mounted on handle 3 for operating levers 14 and valves 13 having one end secured to the free arms of levers 14 and the other end formed with a handle 16 placed conveniently to cross-bar 4 for ease in operation.

17 indicates a rod connecting the rear ends of beams 5 and 18 a rod secured to handle 3 and the rod 17, 19 braces secured to the handle 3 and the ends of beams 5, 20 other braces secured to handle 3 and near the ends of axle 1, 21 braces connecting axle 1 and the ends of beams 5, and 22 braces secured to axle 1 and to boxes 8, the whole structure comprising a light framework truck but possessing sufficient stability to admit of carrying considerable weight and admitting of removal of the truck from the track out of the way of approaching cars without straining it.

It will be understood from the above description and an inspection of the drawings that my improved device is intended for sanding railroad tracks by hand the operator pushing it by means of handle 3 and controlling the amount of sand delivered to the track by opening and shutting the valves 13.

Having thus described my invention what I claim is—

1. A sanding machine comprising an axle, wheels journaled on said axle, a handle secured to said axle, a box supported above each wheel and having a delivery spout connected therewith, a valve in each box, and means secured to the handle for operating the valves, substantially as shown and described.

2. A sanding machine comprising an axle, wheels journaled on said axle, a handle secured to the axle, a box supported above each wheel and having a delivery spout connected therewith, a valve in each box, bell crank levers journaled on the handle, a rod connecting one arm of each lever with a valve, and operating rods secured to the free arms of said levers, substantially as shown and described.

3. A sanding machine comprising an axle, wheels journaled on said axle, a handle secured to said axle, slanting beams supported at each end by said axle and having wheels journaled thereon, boxes having slanting bottoms secured to said beams, a delivery spout secured to each box to deliver the sand therefrom, a valve in each box to control the passage of the sand to said spout, bell-crank levers journaled on said handle, a rod connecting one arm of each lever with the valve, and operating rods slidably mounted on the handle and secured to the free arms of said levers, substantially as shown and described.

In testimony whereof I hereto affix my signature in the presence of two witnesses.

THOS. L. HAMER.

Witnesses:
F. E. BROWN,
T. E. WRIGHT.